(12) United States Patent
Bae

(10) Patent No.: US 7,615,300 B2
(45) Date of Patent: Nov. 10, 2009

(54) DEVELOPMENT OF NOVEL PROTON-CONDUCTIVE POLYMERS FOR PROTON EXCHANGE MEMBRANE FUEL CELL (PEMFC) TECHNOLOGY

(75) Inventor: Chulsung Bae, Las Vegas, NV (US)

(73) Assignee: The Board of Regents University and Community College System of Nevada on Behalf of the University of Nevada, Las Vegas, NV (US)

( * ) Notice: Subject to any disclaimer, the term of this patent is extended or adjusted under 35 U.S.C. 154(b) by 237 days.

(21) Appl. No.: 11/512,937

(22) Filed: Aug. 30, 2006

(65) Prior Publication Data

US 2007/0048579 A1     Mar. 1, 2007

Related U.S. Application Data

(60) Provisional application No. 60/712,542, filed on Aug. 30, 2005.

(51) Int. Cl.
*H01M 4/00*     (2006.01)
*C08J 5/20*     (2006.01)
*B01J 39/20*    (2006.01)

(52) U.S. Cl. .............................. 429/33; 521/27; 521/33
(58) Field of Classification Search ................... 429/33; 521/27, 33
See application file for complete search history.

(56) References Cited

U.S. PATENT DOCUMENTS

| | | | |
|---|---|---|---|
| 5,624,965 A * | 4/1997 | Huang et al. | 521/27 |
| 6,869,980 B2 * | 3/2005 | Cui | 521/27 |
| 6,933,068 B2 * | 8/2005 | Asano et al. | 429/33 |
| 7,001,929 B2 * | 2/2006 | Goto et al. | 521/27 |
| 2003/0091886 A1 | 5/2003 | Tanioka | 429/33 |
| 2003/0173547 A1 * | 9/2003 | Yamakawa et al. | 252/500 |
| 2004/0224218 A1 | 11/2004 | Fan | 429/44 |

FOREIGN PATENT DOCUMENTS

EP     1179550     2/2002

OTHER PUBLICATIONS

Suzuki, Akira, "Synthetic Studies via the Cross-coupling Reaction of Organoboron Derivatives with Organic Halides," Pure & Appl. Chem., vol. 63, pp. 419-422, 1991.*

* cited by examiner

*Primary Examiner*—Patrick Ryan
*Assistant Examiner*—Julian Mercado
(74) *Attorney, Agent, or Firm*—Mark A. Litman & Assoc. PA

(57) ABSTRACT

New thermally and chemically stable sulfonic acid-containing polymers are synthesized via post-sulfonation of aromatic polymers. These new polymers provide unique benefits to proton exchange membrane fuel cell technology ("PEMFC"). As a sulfonic acid moiety can be easily installed into an aromatic ring via electrophilic sulfonation, even in the presence of an electron-withdrawing substituent such as —F, rigid polymers consisting of aromatic rings at either the side chain or main chain can be prepared with a wide range of substituents and flexibility in properties. Novel synthetic procedures are provided for synthesis of the polymers.

21 Claims, 3 Drawing Sheets

1

$SO_3H$ : Proton-conductive moiety

X : electron-withdrawing substituent
⇒ { increase acidity of -$SO_3H$
    stabilize Ar-$SO_3H$ bond Spacer : short insulating spacer
⇒ { consist of stable chemical bonds
    block electric conductivity
    improve solubility
    increase molecular weight

• Aromatic main-chain polymer
⇒ { robust chemical structure
    high thermal, mechanical stabilities

• Mix of meta and para configurations
  in polymer repeat unit
⇒ { disrupt crystallinity
    improve solubility
    increase molecular weight
    easy film processing

*PEM membrane-electrode assembly*

FIG. 3

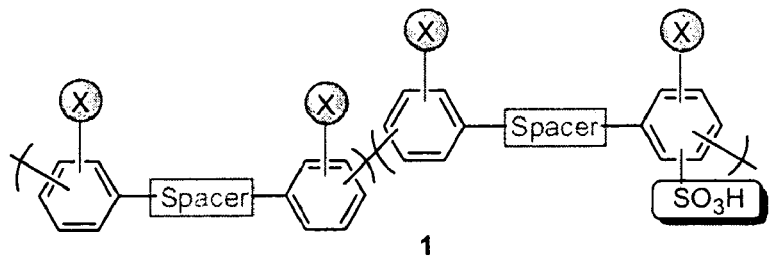

SO₃H : Proton-conductive moiety

X : electron-withdrawing substituent
⇒ { increase acidity of -SO₃H
    stabilize Ar-SO₃H bond Spacer : short insulating spacer
⇒ { consist of stable chemical bonds
    block electric conductivity
    improve solubility
    increase molecular weight

- Aromatic main-chain polymer
  ⇒ { robust chemical structure
      high thermal, mechanical stabilities

- Mix of meta and para configurations
  in polymer repeat unit
  ⇒ { disrupt crystallinity
      improve solubility
      increase molecular weight
      easy film processing

DEVELOPMENT OF NOVEL PROTON-CONDUCTIVE POLYMERS FOR PROTON EXCHANGE MEMBRANE FUEL CELL (PEMFC) TECHNOLOGY

RELATED APPLICATION DATA

This application claims priority from U.S. Provisional Application No. 60/712,542, filed Aug. 30, 2005, which is incorporated herein in its entirety.

BACKGROUND OF THE INVENTION

1. Field of the Invention

The present invention relates to the field of energy, particularly storable energy, fuel cells, and proton exchange membrane fuel cells (e.g., PEMFC).

2. Background of the Art

Clean and highly efficient energy production has long been sought to solve environmental problems associated with the use of current energy sources, in particular the combustion of organic materials and especially the combustion of fossil fuels. Fuel cells, which convert the chemical energies stored in fuel directly into electrical energy, are expected to be a key enabling technology for the twenty-first century. Fuel cells have an enormous potential to provide reliable, clean energy and therefore are touted as ideal primary energy generators for remote locations and automobiles. (B. C. H. Steele and A. Heinzel, "Materials for Fuel-Cell Technologies" *Nature*, 414, 345-352 (2001); M. Winter and R. J. Brodd, "What Are Batteries, Fuel Cells, and Supercapacitors?" *Chem. Rev.*, 104, 4245-4269 (2004).) Although fuel cells were used effectively in the Gemini space program in the early 1960s, they have not become a commercially viable industrial technology, largely owing to a lack of appropriate membrane materials. (M. Rikukawa and K. Sanui, "Proton-Conducting Polymer Electrolyte Membranes Based on Hydrocarbon Polymers" *Prog. Polym. Sci.*, 25, 1463-1502 (2000).)

Among the types of fuel cells under active development, the proton exchange membrane fuel cell (PEMFC) is generally considered the most attractive power source for automotive use. In PEMFCs, the most important component is a proton exchange membrane (PEM), which separates the fuel from the oxidant but allows for proton ($H^+$) transport from the anode to the cathode. For a proton-conducting material (typically a polymer electrolyte) to be used successfully as a PEM in PEMFCs, it must have (1) good chemical and electrochemical stability under fuel cell operating conditions, (2) good mechanical stability in both dry and hydrated states, (3) high proton conductivity, (4) zero electric conductivity, and (5) low production cost.

A PEM (Proton Exchange Membrane, also called Polymer Electrolyte Membrane) fuel cell uses a simple chemical reaction to combine hydrogen and oxygen into water, producing electric current in the process. For those interested in the chemistry, it works something like electrolysis of water in reverse order:

1. At the anode, hydrogen molecules give up electrons, forming protons ($H^+$). This process is made possible by the platinum catalyst.

2. The proton exchange membrane allows protons to flow through, but not electrons. As a result, the protons flow directly through the proton exchange membrane to the cathode, while the electrons flow through an external circuit.

3. As they travel to the cathode through the external circuit, the electrons produce electrical current. This current can perform useful work by powering any electrical device (such as an electric motor or a light bulb).

4. At the cathode, the electrons and protons combine with oxygen to form water.

5. In a fuel cell, hydrogen's natural tendency to oxidize and form water produces electricity and useful work.

6. No pollution is produced and the only byproducts are water and heat.

Anode: $2H_2 \longrightarrow 4H^+ + 4e^-$

Cathode: $4e^- + 4H^+ + O_2 \longrightarrow 2H_2O$

Overall: $2H_2 + O_2 \longrightarrow 2H_2O$

Most membrane materials currently being tested in PEMFC demonstration units are based on sulfonated perfluoropolymers such as Nafion™ (Diagram 1[a]). These materials are essentially the same as those employed almost 30 years ago. Unfortunately, sulfonated perfluoropolymers have shortcomings that seriously limit their wide application in stationary or automobile power sources. These drawbacks include low proton conductivity at low humidity or high temperature (>100° C.), relatively low mechanical stability at high temperature, high cost, and high methanol permeability in direct methanol fuel cells. If membrane materials can be found that are capable of operating at high temperatures (~120° C.), most of the shortcomings of current PEMs could be eliminated owing to the resulting benefits: (1) enhanced reaction kinetics, (2) simplified water management, (3) simplified thermal balance, (4) better heat recovery as steam that can increase the overall system efficiency of PEMFCs, and (5) reduced CO poisoning. Thus, the U.S. Department of Energy (DOE) and researchers around the world are making great efforts to develop alternative, low-cost, high-temperature, polymer-based electrolytes that have good chemical resistance, good mechanical stability, and sufficient proton conductivity (Table 1).

TABLE 1

| | Technical Targets of Proton Exchange Membranes set by the U.S. Department of Energy[i] | | | | |
|---|---|---|---|---|---|
| Characteristic | PEM conductivity (S/cm) | Operating temperature (° C.) | Area-specific resistance (Ohm-cm²) | Cost ($/m²) | Durability with cycling (hours) At ≦80° C. At >80° C. |
| Targets to be achieved by 2010 | 0.1 (at ≦120° C.) 0.07 (at room temp) 0.01 (at −20° C.) | ≦120 | 0.02 | 40 | 5000 2000 |

Diagram 1. Chemical structures of current proton exchange membranes.
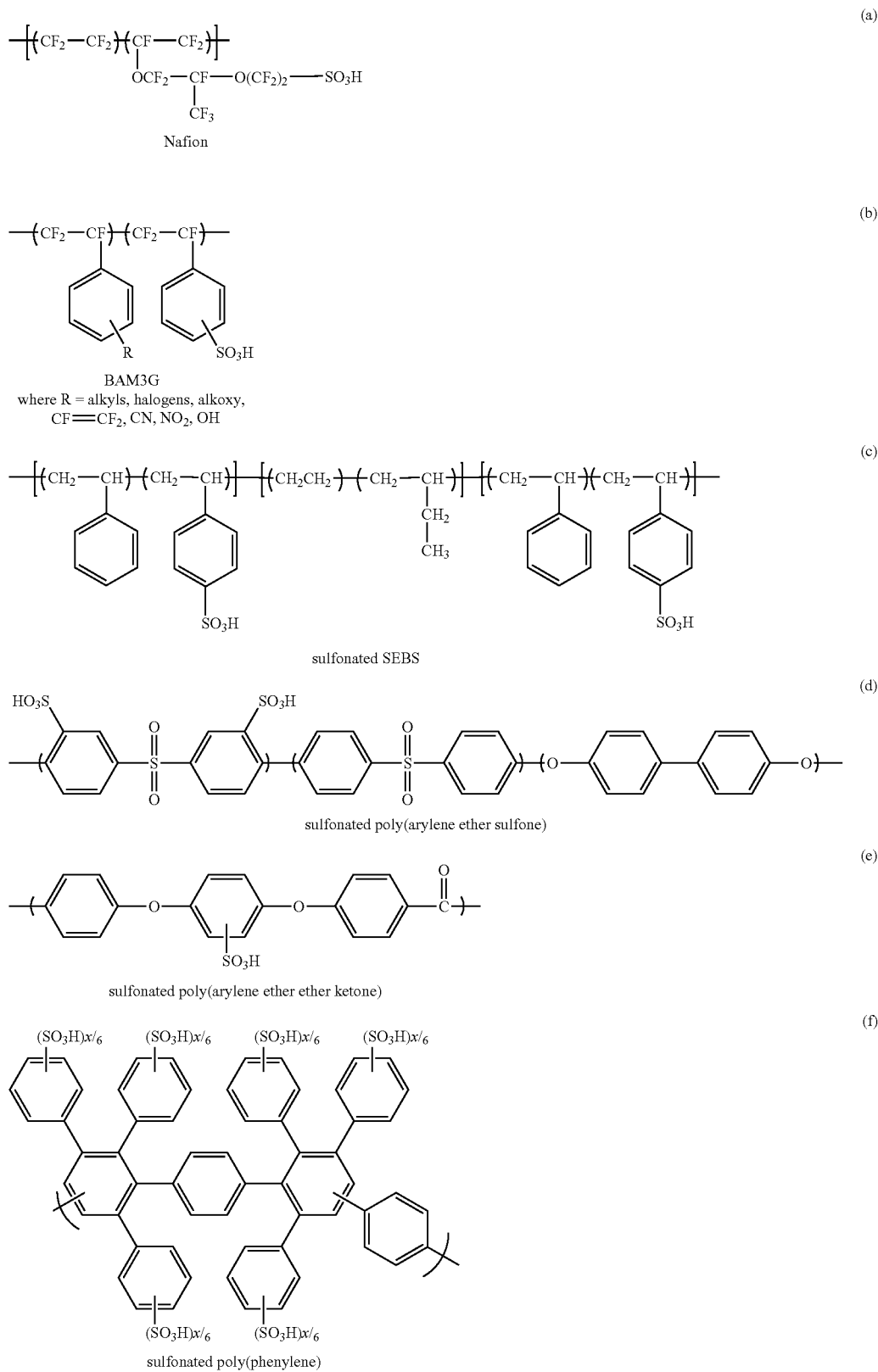

-continued

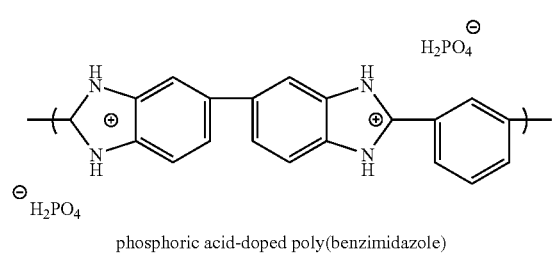

phosphoric acid-doped poly(benzimidazole)

(g)

Among currently known alternative membranes, BAM3G (Ballard Advanced Materials third-generation membrane) (Diagram 1[b]) from Ballard Advanced Materials (Burnaby, British Columbia)[ii] and sulfonated block copolymer of styrene-ethylene-butylene-styrene (SEBS) from Dais Analytic Corporation (Odessa, Fla.; Diagram 1[c]) have been semi-commercialized. BAM3G is considered the best commercially available membrane in terms of performance and chemical stability given the limitations of current practical fuel cell operating conditions. BAM3G is a partially fluorinated polystyrene-like electrolyte membrane in which C—F bonds are substituted at the benzylic position. The presence of an electron-withdrawing group (—CF—) at the benzylic position of the aromatic ring renders the sulfonic acid group as a stronger acid than typical aryl sulfonic acid. However, developing structurally related materials that may offer improved properties has proven difficult owing to presumed high cost and the limited availability of the trifluorostyrene monomers of BAM3G. In addition, the polystyrene-like polymer has flexible main-chain structure which may not be suitable for use in high-temperature (~120° C.) fuel cell conditions.

Other types of high temperature polymer electrolyte membranes under investigation are chemically modified engineering polymers such as sulfonated poly(arylene ether sulfone) (Diagram 1[d]), sulfonated poly(arylene ether ether ketone) (Diagram 1[e]), sulfonated poly(phenylene) (Diagram 1[f]), and phosphoric acid-doped poly(benzimidazole) (Diagram 1[g]). These engineering polymers have been pursued as alternative PEM candidates because they can withstand the corrosive environments found in fuel cells. The sulfonated aromatic main-chain polymers, however, show sufficient proton conductivity only at high level of sulfonations where, unfortunately, they swell excessively on hydration and lose mechanical integrity above certain temperatures (60-80° C.). If this shortcoming cannot be overcome, it might prevent their use as high-temperature fuel cell membranes. Phosphoric acid-doped poly(benzimidazole) is known to show good proton conductivities at temperatures up to 200° C. The main disadvantage of the system is that the phosphoric acid molecules can diffuse out of the membrane at high temperatures because they are used in excess relative to basic sites of polymer.

Published U.S. Patent Application No. 20040224218A1 (Fan) describes a method and device for reducing or substantially eliminating methanol crossover from the anode to the cathode of a direct methanol fuel cell and for increasing catalyst efficiency in which a catalyst ink layer comprising an electron conductive and proton conductive binder material is applied either to the anode electrode or the electrolyte layer of the direct methanol fuel cell.

Published U.S. Patent Application No. 20030091886A1 (Tanioka) describes a polyelectrolyte comprising at least a styrenic polymer having a syndiotactic configuration and exhibiting an ion exchange capability, a polyelectrolyte membrane produced by forming the polyelectrolyte into a film, and a fuel cell using the polyelectrolyte membrane. The polyelectrolyte of the present invention is inexpensive and exhibits a good long-term stability, and is suitably used for fuel cells, production of common salt from sea water and recovery of acids from waste water.

European Patent No. 1179550 discloses the preparation of a polyelectrolyte membrane for fuel cells in which the polyelectrolyte comprises at least a styrenic polymer having a syndiotactic configuration (s-PS) as an essential component. The s-PS may or may not contain ion exchange groups therein. Accordingly, the polyelectrolyte is classified into two types, i.e., (1) those polyelectrolytes comprising an ion-exchange group containing thermoplastic resin other than s-PS, an ion-exchange group-free s-PS, and if required, the other ion-exchange group-free thermoplastic resin; and (2) those polyelectrolytes comprising a thermoplastic resin containing at least an ion-exchange group-containing s-PS, and if required, an ion-exchange group-free thermoplastic resin. As with the thermoplastic resins other than s-PS used in the polyelectrolytes (1) and (2), any suitable thermoplastic resins may be used without particular limitations. The weight-average molecular weight of the styrenic polymers is preferably 10,000 or higher, and more preferably 50,000 or higher. Of these styrenic polymers, syndiotactic polystyrene is especially preferred.

SUMMARY OF THE INVENTION

New thermally and chemically stable sulfonic acid-containing polymers which can be synthesized via postsulfonation of aromatic polymers (see Diagrams 2 and 8) provide unique benefits to proton exchange membrane fuel cell technology (hereinafter, "PEMFC"). As a sulfonic acid moiety can be easily installed into an aromatic ring via electrophilic sulfonation, even in the presence of an electron-withdrawing substituent such as —F, rigid polymers consisting of aromatic rings at main chain can be prepared with a wide range of substituents and flexibility in properties.

The technology described and enabled herein further relates to the synthesis, by way of transition metal-catalyzed polymerization followed by postsulfonation, of a variety of novel aromatic copolymer electrolytes. These novel aromatic copolymer electrolytes have been evaluated with respect to their ability to conduct protons under the operational fuel cell conditions stated in Table 1 of this document. These novel aromatic polymer electrolytes have been systematically studied with respect to the influence of the polymer's chemical structure on the morphology of the material and their performance in fuel cell conditions. It is believed that these polymer electrolytes may be able to provide next-generation proton exchange membranes that will overcome at least some of the limitations of currently available fuel cell membranes

BRIEF DESCRIPTION OF THE FIGURES

FIG. 3 shows a generic chemical structure for practice of the present technology.

DETAILED DESCRIPTION OF THE INVENTION

Developing efficient, reliable, environmentally friendly energy sources is one of the most challenging tasks of the twenty-first century. Among available alternative energy options, fuel cells are recognized as an ideal energy solution for many applications, including transportation and portable electronics. One favored design, the proton exchange membrane fuel cell (PEMFC), uses a membrane made of polymer electrolytes. Proton exchange membranes (PEMs) are currently based on sulfonated perfluoropolymers such as Nafion™ polymer. Unfortunately, these materials have serious shortcomings—including restricted operating temperatures and the need for external humidification—that limit wide commercial application. Thus, the development of alternative PEMs that remedy these shortcomings is required before broad use of this promising technology can be achieved.

To provide novel proton exchange membranes, a new method for the synthesis of PEMs is disclosed that uses the transition metal-catalyzed polymerization of dibromoarenes and aryldiboronic esters and the subsequent postsulfonation of the aromatic rings at the polymer main chain. The presence of an electron-withdrawing group in the dibromoarenes will not only enhance the polymerization rate and increase the molecular weight of the polymer but also render the sulfonic acid group of the sulfonated polymer as a much stronger acid. The insertion of short spacer and/or mixed configurations of meta- and para-substitution in the polymer main chain will produce the proposed materials as amorphous high-molecular-weight aromatic polymers, which allow convenient film processing. Because of the rigid chemical structure and electron-deficient character of the proposed aromatic polymers, it is believed that these materials will offer not only superior chemical and thermal stabilities but also higher proton conductivity at high temperature (~120° C.) and low relative humidity (25-50%) conditions when compared with currently available PEMs. In addition, the hydrophobic feature of the proposed polymers is expected to reduce water uptake on hydration and enhance compatibility with membrane electrode assemblies.

Because many aromatic monomers in the present disclosure are commercially available or can be easily prepared, a variety of PEMs my be produced using a combinatorial approach and to identify materials that (a) overcome the shortcomings of current PEMs, and (b) meet the target properties set by the U.S. Department of Energy. Further extensive study of the chemical structure of the disclosed and enabled PEMs and their performance in fuel cell operations will provide a better understanding of structure-property relationships, which in turn will lead to improved follow-on polymer designs. Success in these efforts can be an important step toward widespread application and commercialization of PEMFC technology.

Figure 1:
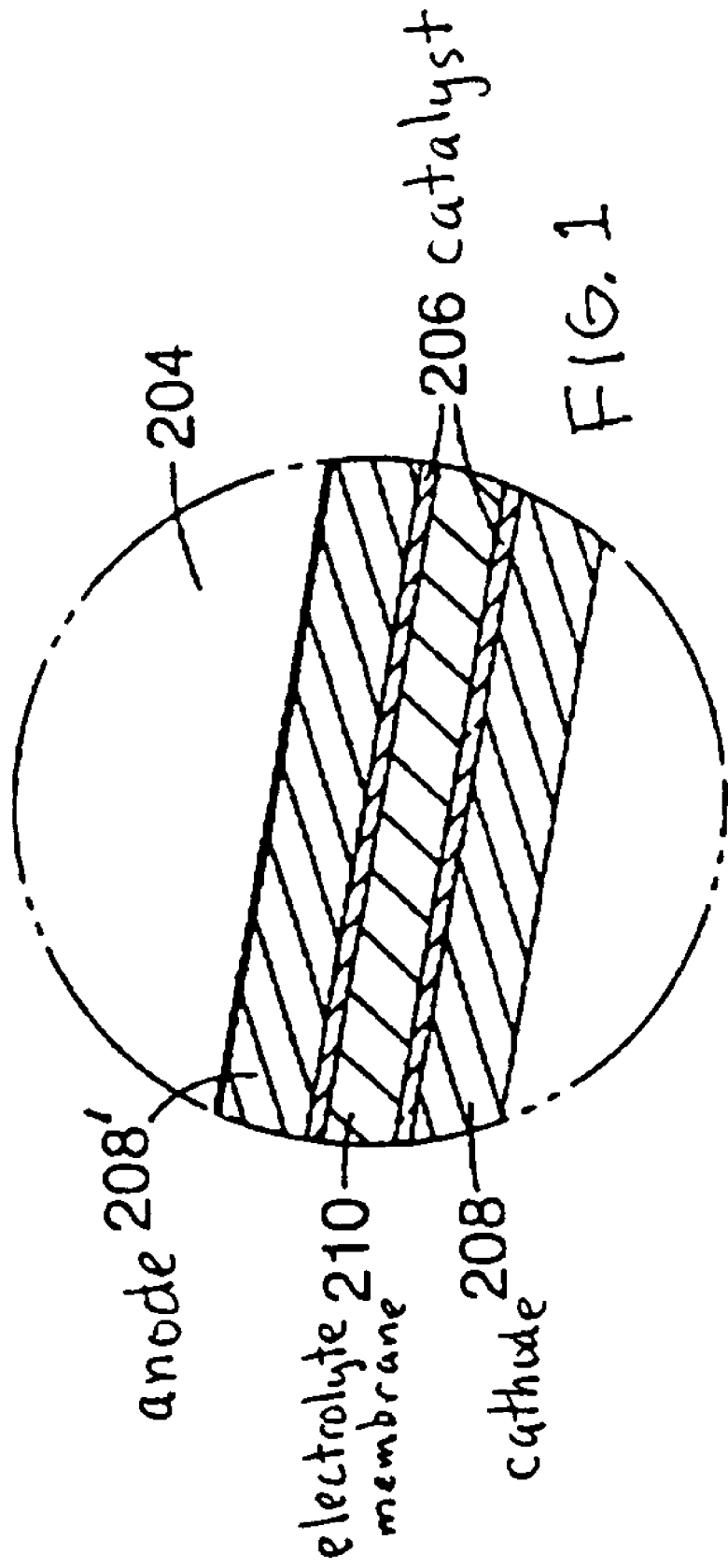
FIG. 1 shows a schematic of a polymer exchange fuel cell.

The proton exchange membrane fuel cell (PEMFC) is one of the most promising technologies. This is the type of fuel cell that will end up powering cars, buses and maybe even homes. In FIG. 1, one can see there are four basic elements in one non-limiting example of a structure for a PEMFC:

The anode, the negative post of the fuel cell, has several functions. It conducts the electrons that are freed from the hydrogen molecules so that they can be used in an external circuit. It has channels etched into it that disperse the hydrogen gas equally over the surface of the catalyst.

The cathode, the positive post of the fuel cell, has channels etched into it that distribute the oxygen to the surface of the catalyst. It also conducts the electrons back from the external circuit to the catalyst, where they can recombine with the hydrogen ions and oxygen to form water.

The electrolyte is the proton exchange membrane. This specially treated material, which looks something like ordinary kitchen plastic wrap, only conducts positively charged ions. The membrane blocks electrons.

The catalyst is a special material that facilitates the reaction of oxygen and hydrogen. It is usually made of platinum powder very thinly coated onto carbon paper or cloth. The catalyst is rough and porous so that the maximum surface area of the platinum can be exposed to the hydrogen or oxygen. The platinum-coated side of the catalyst faces the PEM.

FIG. 1 also shows how the pressurized hydrogen gas ($H_2$) entering the fuel cells on the anode side. This gas is forced through the catalyst by the pressure. When an $H_2$ molecule comes in contact with the platinum on the catalyst, it splits into two $H^+$ ions and two electrons ($e^-$). The electrons are conducted through the anode, where they make their way through the external circuit (doing useful work such as turning a motor) and return to the cathode side of the fuel cell. Meanwhile, on the cathode side of the fuel cell, oxygen gas ($O_2$) is being forced through the catalyst, where it forms two oxygen atoms. Each of these atoms has a strong negative charge. This negative charge attracts the two $H^+$ ions through the membrane, where they combine with an oxygen atom and two of the electrons from the external circuit to form a water molecule ($H_2O$). This reaction in a single fuel cell produces only about 0.7 volts. To get this voltage up to a reasonable level, many separate fuel cells must be combined to form a fuel-cell stack. PEMFCs operate at a fairly low temperature (about 176 degrees Fahrenheit, 80 degrees Celsius), which means they warm up quickly and don't require expensive containment structures. Constant improvements in the engineering and materials used in these cells have increased the power density to a level where a device about the size of a small piece of luggage can power a car.

Figure 2:
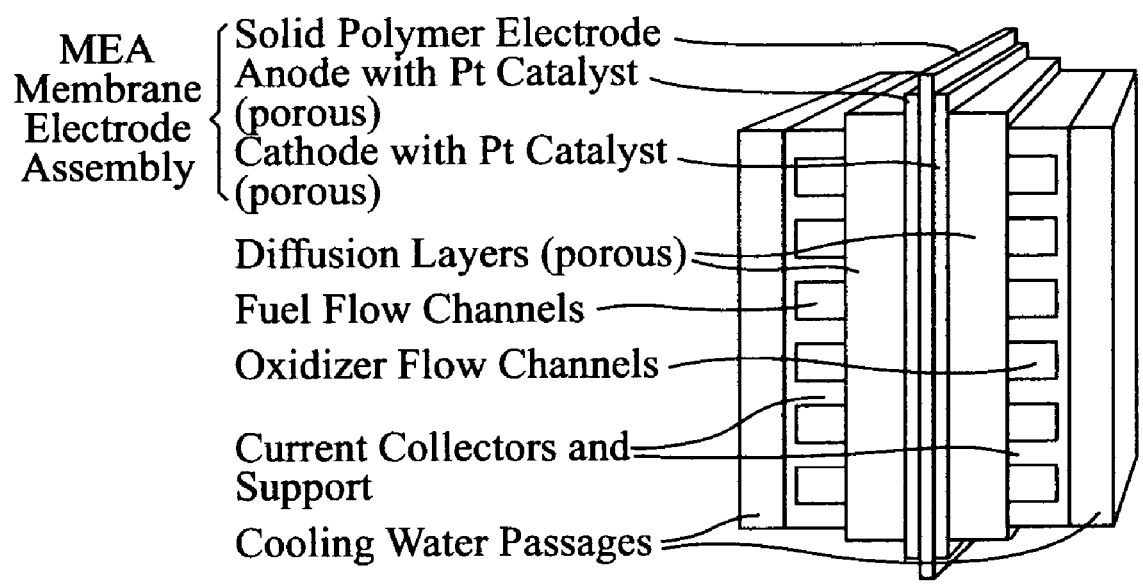
FIG. 2 shows a typical membrane electrode assembly (MEA).

The PEMFC uses a polymer membrane as an electrolyte. The polymer is capable of conducting positive hydrogen ions: protons ($H^+$). The electrolyte is sandwiched between two electrodes, thin layers that contain Pt-based catalysts that help the oxidation and reduction reactions to take place. These electrodes are generally applied on a support of carbon cloth or graphite paper. The combination of electrodes and polymer membrane electrolyte is usually referred to as MEA (Membrane Electrode Assembly). The MEA is clamped between two gas flow field compartments to produce a single cell. See FIG. 2 for a typical MEA construction.

When hydrogen is fed to the anode compartment, and air or oxygen to the cathode compartment, an electrical potential of approximately 1 Volt builds up. When the anode and cathode are externally connected by an electrical load, a current is produced and hydrogen and oxygen are consumed.

The potential of the PEMFC drops as a function of current drawn from the cell. After an initial steep drop in potential, there is an almost linear relation between current density and potential. The power increases as a function of load, according to an almost parabolic curve. At high current density, close to the highest power density, the potential starts to drop off non-linearly. The composition of the polymer membrane is clearly fundamental to the quality of performance of the PEMFC.

Description of Invention 1: Sulfonated Syndiotactic Polystyrene

Syndiotactic polystyrene (sPS) is a commercially available inexpensive engineering plastic. In contrast to atactic polystyrene, which is produced by either radical or anionic polymerization of styrene and has neither crystallinity nor melting point, sPS is synthesized via transition metal-catalyzed coordination polymerization. The stereospecific polymerization of sPS gives it unique main-chain tacticity, as shown in Diagram 2. Because of this tacticity, sPS has a high degree of crystallinity, a high melting point (270° C.), and excellent chemical resistance. Because heteroatoms in polar groups coordinate with metal catalyst and lead to the poisoning of the catalyst, synthesis of sPS that contains polar groups (functionalized sPS) via stereospecific copolymerization of styrene and functionalized styrene is a difficult task in polymer chemistry. Hence, sulfonated sPS can be prepared via the postsulfonation of sPS according to Diagram 2. The sulfonated sPS will have superior mechanical and thermal properties than those of sulfonated SEBS (Diagram 1[c]) because the crystallinity of sPS makes it less permeable to organic solvents and water and less vulnerable to oxidative degradation.

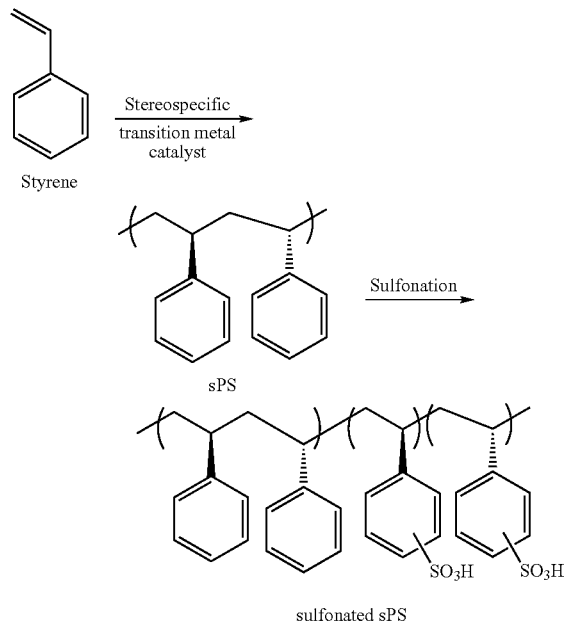

Diagram 2. Synthesis of sulfonated syndiotactic polystyrene.

Description of Invention 2: Sulfonated Poly(arylene-alt-alkylene)s

The below diagram graphically depicts a general method described herein for synthesizing new polymer electrolyte materials that meet the technical targets in Table 1. Without limiting the scope of the disclosed technology, it is believed that to best obtain those targets, new PEM materials should be considered with respect to attaining six features. Those six requirements and unique polymer designs disclosed herein and the strategies to meet those six features are in the list that follows in FIG. 3.

Diagram 3. Graphical description of the six strategies for new proton exchange membrane materials.

(1) High proton conductivity: An arylsulfonic acid functionality is strongly acidic, allowing for high proton conductivity. To further increase the acidity of the group, we will introduce strong electron-withdrawing groups, such as —F, —CF$_3$, and —CF$_2$—, (and at least as strong as Cl) into the aromatic ring of the polymer chains. Because the acid strength is the controlling factor in proton conductivity at low relative humidity (RH), this feature will play an important role in meeting the objective of the solicitation.

(2) Chemical stability: Although the C—H bonds of the aromatic ring (bond dissociation energy [BDE]=112 kcal/mol) of the polymer are known to be stable in oxidative conditions, C—H bonds at the benzylic position (BDE=77 kcal/mol) are relatively weak against free radical attack. Thus, all benzylic positions of the polymers will be made of chemically stable bonds such as C—F (BDE=103 kcal/mol for benzylic C—F).

(3) Thermal and mechanical stability: To achieve high thermal and mechanical stability, a polymer should have high glass transition temperature ($T_g$). Aromatic main-chain polymers are known to have high $T_g$ and hence will be used in this work. The substitution of an electron-withdrawing group on aromatic rings will strengthen the bond between the ring and sulfonic acid which in turn will diminish de-sulfonation at high temperature operation.

(4) Solubility in organic solvents and film processability: Insertion of short spacers and/or mixed meta and para configurations in the polymer main chains will disrupt crystallization of the polymer and improve solubility in organic solvents. The improved solubility will contribute to increased molecular weights and allow convenient film processing of the polymer.

(5) Low swelling on hydration: Combined effects of the high $T_g$ and substitution of C—F bonds in the polymer main chain will render the polymeric materials rigid and hydrophobic and thus less susceptible to swelling on hydration. Because sulfonated perfluoropolymer (i.e., Nafion™ polymer) is used as a polymer electrolyte in PEMFC electrodes, the fluorine substitution in the new PEM materials will also enhance compatibility with the electrodes in fuel cells, which is important for durable membrane electrode assemblies (MEAs) in PEMFCs.

(6) Zero electric conductivity: Insertion of a short spacer between the aromatic rings of the polymer main chain will completely block electric conductivity while maintaining the rigidity of the polymer chain.

As shown in Diagram 4, the target polymers 1, sulfonated poly(arylene-alt-alkylene)s, can be synthesized through postsulfonation of alternating copolymers 2, which can be prepared via transition metal-catalyzed cross-coupling polymerization of dibromoarenes 3 and aryldiboronic esters 4. Note that the double arrow (=>) in Diagram 4 indicates retrosynthetic direction. Overall, rigid polymers in which an acid stronger than a typical arylsulfonic acid (e.g., phenylsulfonic acid, pK$_a$~−2) is attached to the electron-poor aromatic rings of the main chain will be prepared in this project.

Diagram 4. Retrosynthetic analysis of target polymers 1.

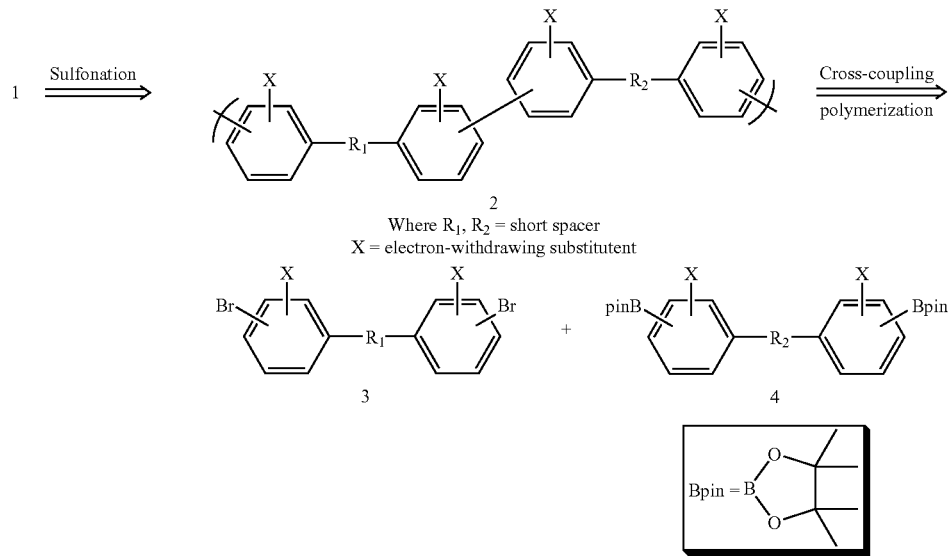

Monomer Synthesis: As listed in Diagram 5, a variety of monomers 3 and 4, which are either commercially available or can be easily prepared using known synthetic methods, will be used for the preparation of 2. Diagrams 6 and 7 provide detailed synthetic schemes for the monomers.

Dibromoarenes 3e, 3g, 3h, 3j, and 3k are commercially available compounds. Compound 3a can be prepared by gem-difluorination of 5a, using Deoxo-Fluor reagent ($CH_3OCH_2CH_2)_2N$—$SF_3$ (equation 1 of Diagram 6). Alternatively, 3a can be synthesized by gem-difluorination of $5a_3$ using Selectfluor and pyridinium polyhydrogen fluoride (PPHF) (equation 2 of Diagram 6). Fluorination of diarylacetylene 5b with nitosonium tetrafluoroborate-PPHF will produce 3b in a single step (equation 3 of Diagram 6). Reaction of hexafluoroglutaric acid with $XeF_2$ in the presence of bromobenzene will give 1,3-diarylhexafluoropropane 3c as a mixture of ortho-, meta-, and para-isomers (equation 4 of Diagram 6). Conversion of aryl alcohols to aryl bromides using $Ph_3PBr_2$ will be adopted for the synthesis of 3d (equation 5 of Diagram 6). Compounds 3f, 3i, 3l, and 3m can be conveniently prepared via diazotization of corresponding arylamines, 5f, 5i, 5l, and 5m, followed by reaction with CuBr (for 5f, 5i, and 5m) or $HBF_4$ (for 5l) (equation 6 of Diagram 6). Difluorosilanes 3n and 3o can be prepared via the fluorination of the corresponding hydrosilanes 5n and 5o, respectively (equation 7 of Diagram 6). Meta-dibromoaryl ketone 5p and meta-dibromodiarylacetylene 5q will be transformed to the corresponding meta-dibromoarenes 3p and 3q, respectively, using procedures similar to those of equations 2 and 3 (equations 8 and 9 of Diagram 6).

Diagram 5. Examples of monomers: Dibromoarenes 3 and aryldiboronic esters 4.

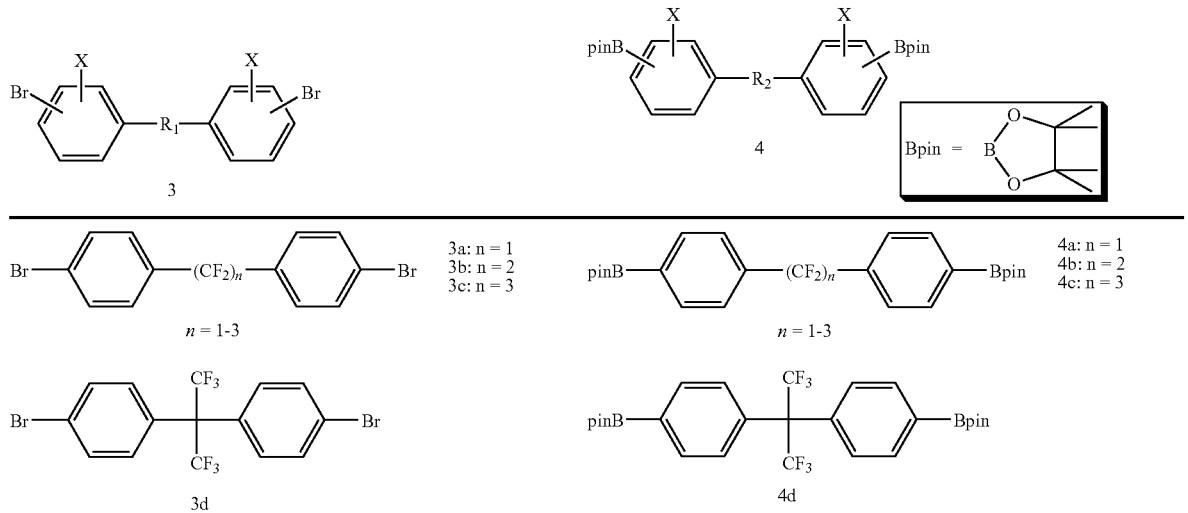

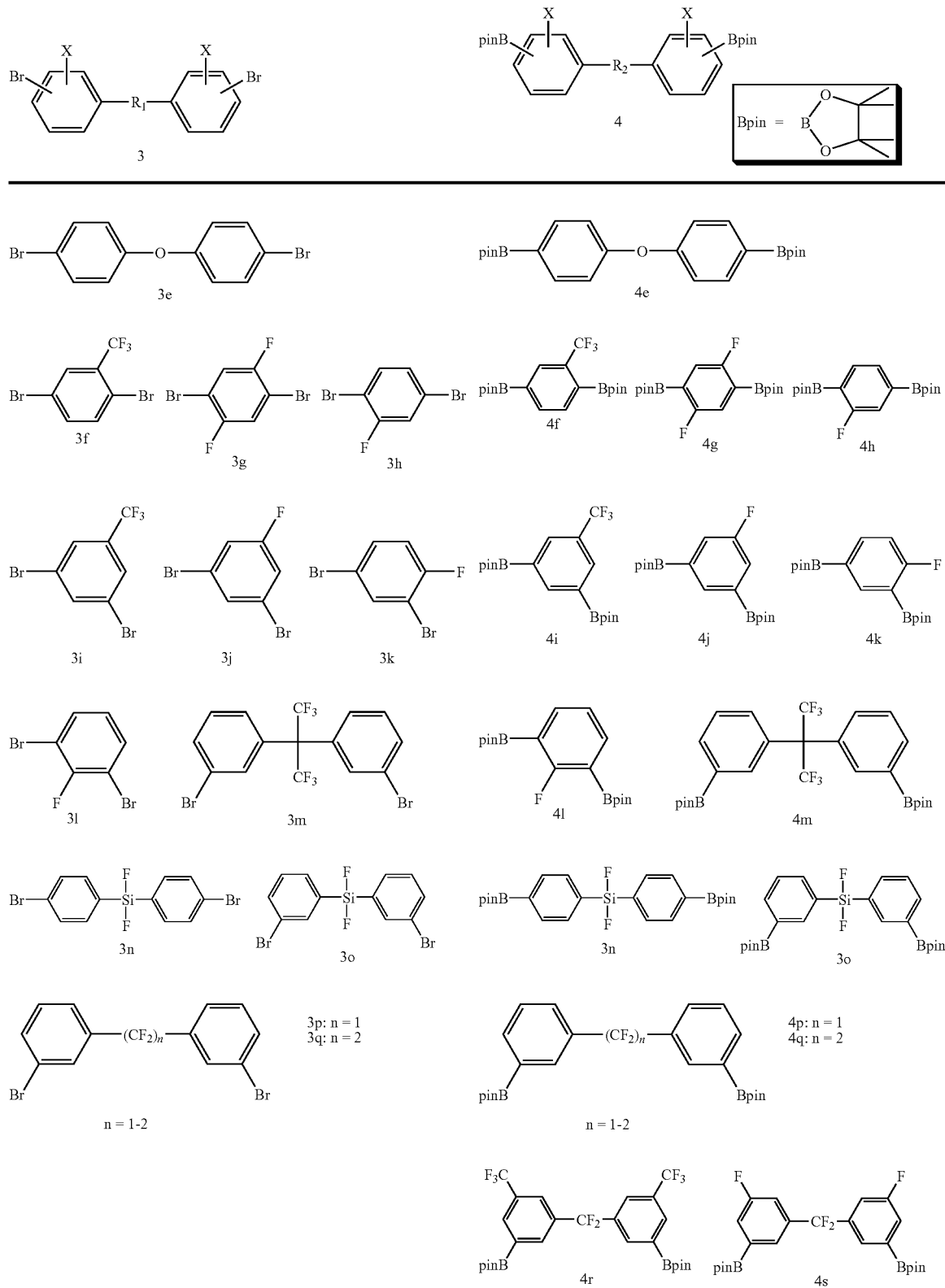
Diagram 5. Examples of monomers: Dibromoarenes 3 and aryldiboronic esters 4.

Diagram 6. Synthesis of dibromoarenes 3.

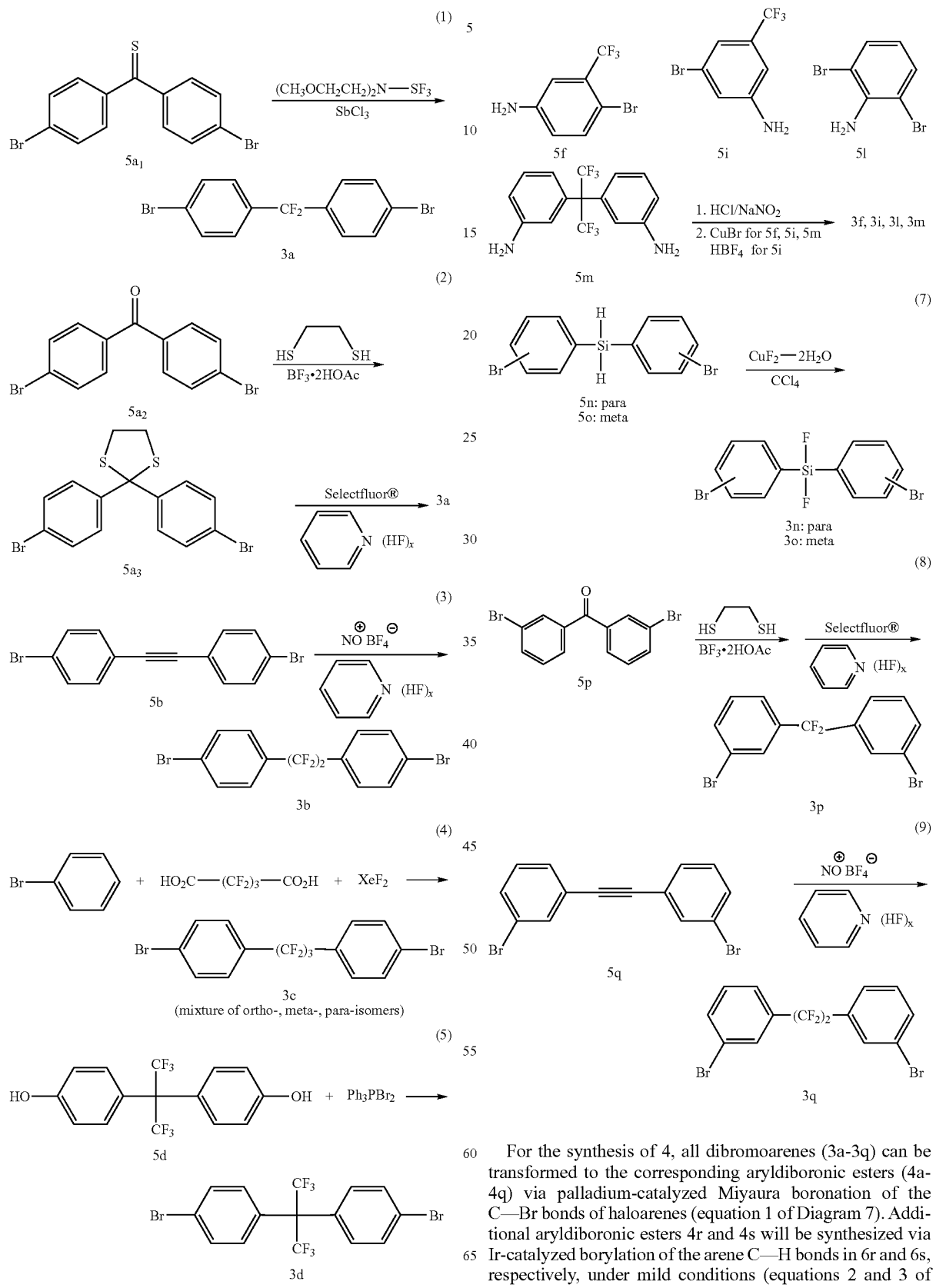

For the synthesis of 4, all dibromoarenes (3a-3q) can be transformed to the corresponding aryldiboronic esters (4a-4q) via palladium-catalyzed Miyaura boronation of the C—Br bonds of haloarenes (equation 1 of Diagram 7). Additional aryldiboronic esters 4r and 4s will be synthesized via Ir-catalyzed borylation of the arene C—H bonds in 6r and 6s, respectively, under mild conditions (equations 2 and 3 of Diagram 7). Because the borylation is known to occur selectively at the least sterically hindered C—H bond of arenes, and electron-withdrawing groups of the arenes facilitate the reaction, the reactions in equations 2 and 3 of Diagram 6 will produce pure 4r and 4s, respectively, not a mixture of isomers.

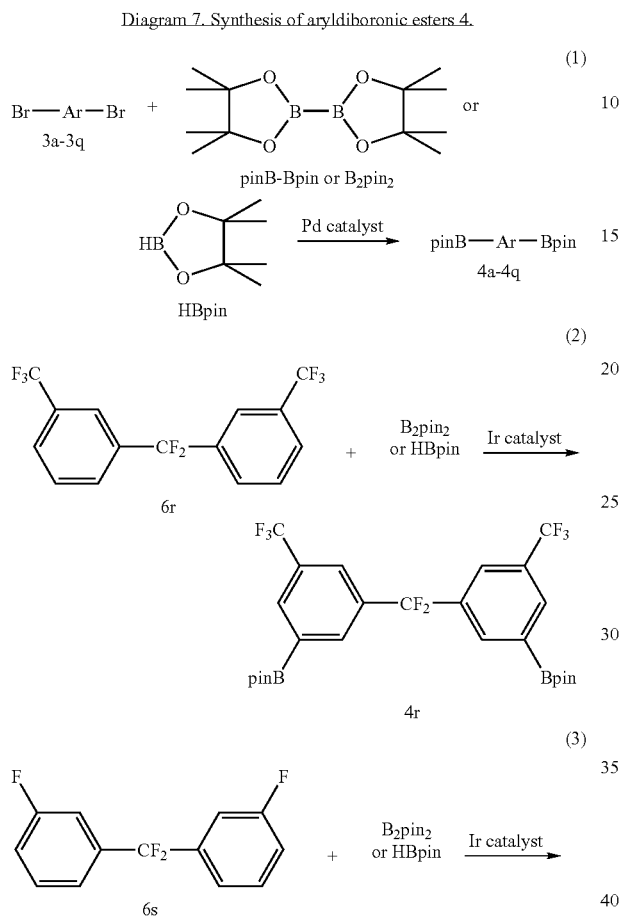

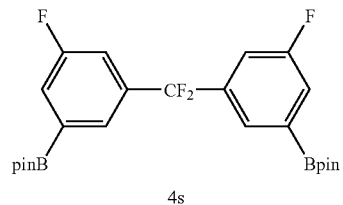

Polymer Synthesis and Characterization: Palladium-catalyzed Suzuki-Miyaura cross-coupling reactions of 3 and 4 will give aromatic copolymers 2 that consist of alternating arylene and alkylene units (Diagram 8). The cross-coupling reaction has been well studied in organic synthesis for the formation of new C—C bonds between haloarene and arylboronic ester and widely used for synthesis of rigid-rod conjugated polymers. To prevent the undesirable precipitation of the growing chain as a low-molecular-weight oligomer owing to poor solubility, the insertion of short spacer ($R_1$ and $R_2$ of Diagram 8) between aromatic rings and/or mixed configurations of meta- and para-substitutions of 2 will be adopted to make the polymer soluble in organic solvents and thereby increase molecular weight. As a result, 2 will be synthesized as rigid, high-molecular-weight, electrically non-conducting polymers. One potential risk of the polymerization is contamination of 2 with Pd catalyst residue when relatively high concentrations (2-5%) of Pd catalyst are used. To overcome this problem, we will adopt recently developed the most efficient Suzuki-Miyaura cross-coupling reaction systems, which typically require low catalyst loading (0.00001-1%), for the synthesis of 2.

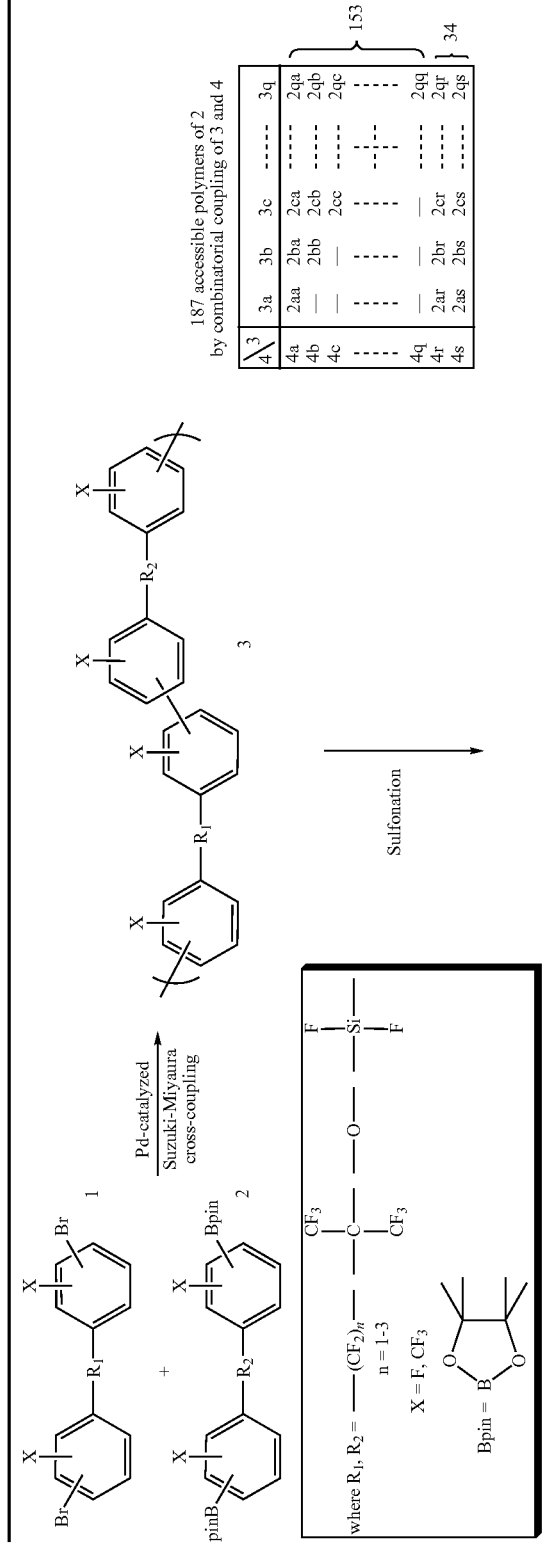
Diagram 8. Synthesis of sulfonated aromatic copolymers 1.

Once precursor copolymers 2 are synthesized, they will be sulfonated using chlorosulfonic acid under an appropriate solvent. Although electron-deficient aromatics are generally known to be less reactive than are electron-rich aromatics toward electrophilic sulfonation, there have been successful sulfonations of such systems, including fluorobenzene Thus, as in the postsulfonation of poly($\alpha,\beta,\beta$-trifluorostyrene) in Diagram 9, the degree of sulfonation of 2 can be controlled by changing the reaction time, the reaction temperature, and the concentration of the sulfonation reagent. The structure of proposed PEMs 1 will be studied using NMR spectroscopic methods, and their average molecular weights will be investigated by gel permeation chromatography (GPC).

Diagram 9. Postsulfonation of poly($\alpha$, $\beta$, $\beta$-trifluorostyrene).

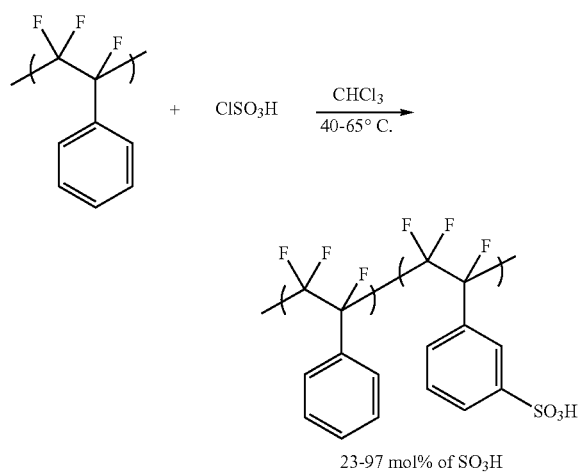

23-97 mol% of SO$_3$H

Membrane Characterization: Prescreening of the physical properties of the synthesized polymers will be conducted to identify outperforming membranes before they are delivered to the awardee of Task 2 for testing in fuel cell conditions. In particular, a proton conductivity study of synthesized ionomer membranes is of importance to fuel cell operation. We will prepare an electrochemical cell and measure proton conductivity up to 150° C. with RH up to 100%. In addition, the following properties of new PEMs will be investigated to screen and identify promising membrane materials before delivery to the awardee of Task 2.

i) Ion-exchange capacity of the material will be measured by an exchange of acidic protons with Na$^+$ ions in solution. The equivalent weight of the membrane will be determined by measuring the dry weight of the polymer and the quantity of exchanged protons.

ii) The water uptake and the proton conductivity can be measured simultaneously in an environmental chamber. A potentiostat/galvanostat Model Radiometer Analytical, Voltalab80 Model PGZ402 will be used to run electrochemical impedance analysis.

iii) Thermal properties such as T$_g$ of 1 and 2 will be investigated using a differential scanning calorimeter.

iv) Chemical stability of 1 will be characterized using Fenton's test.

Discussion of Sulfonated Poly(arylene-alt-alkylene)s

The alternating copolymers 2 and their sulfonated polymers 1 are expected to offer many advantages over the existing sulfonated polymer electrolyte membranes shown in Diagram 1. We provide a list of those advantages below and in particular highlight numerous comparisons with poly($\alpha,\beta,\beta$-trifluorostyrene), the base material of BAM3G (Diagram 1[b]):

(1) The position of the aromatic ring in the polymer main chain makes 1 more robust than BAM3G in terms of mechanical integrity and thermal stability. Note that whereas BAM3G has a sulfonic acid group on the aromatic ring of the side chain, 1 has a sulfonated aromatic ring in the main chain of the polymer. Because thermal and mechanical stabilities of polymers strongly depend on the chemical structure of the polymer main chain, and 1 has a more rigid main chain than that of BAM3G, 1 will provide better thermal stability and mechanical integrity than BAM3G under fuel cell operating conditions. To substantiate this claim, we illustrate the following examples of known polymers: Poly($\alpha,\beta,\beta$-trifluorostyrene) has softening temperature of 185° C.[iii] The T$_g$ of poly($\alpha,\beta,\beta$-trifluorostyrene) was not clearly reported but believed to be significantly lower than the softening temperature. Among the proposed materials 2 of Diagram 8, poly[[1,1'-biphenyl]-4,4'-diyl[2,2,2-trifluoro-1-(trifluoromethyl)ethylidene]] (2dd of Diagram 8) is a known polymer that has been prepared by Ni-catalyzed coupling of 2,2-bis(p-chlorophenyl)hexafluoropropane (see Diagram 10). The obtained polymer has M$_n$=19,000 g/mol, and the T$_g$ is 255° C. As is consistent with our strategy 4 (i.e., solubility in organic solvents and film processability), this polymer was found to be soluble in organic solvents. The solubility and mechanical properties of similar poly(biphenylene-alt-methylene)s can be manipulated with proper selection of the spacers.

Diagram 10. Reported example of aromatic copolymer 2dd (M$_n$ = 19000-27000 g/mol, T$_g$ = 255° C.).

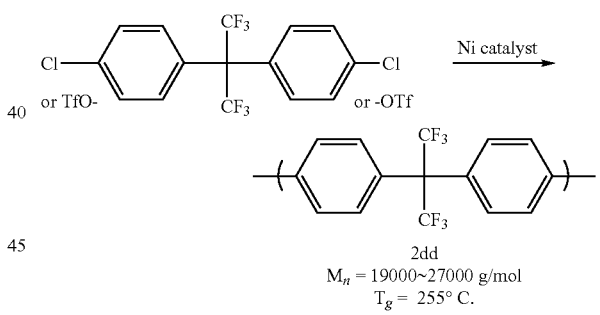

2dd
M$_n$ = 19000~27000 g/mol
T$_g$ = 255° C.

(2) Synthetically, a variety of precursor polymers 2 can be conveniently prepared via the Suzuki-Miyaura cross-coupling reaction of dibromoarenes 3 and aryldiboronic esters 4. Based on the monomers of Diagram 5, 187 structurally similar polymers of 2 are theoretically accessible by combining 3 and 4 (Diagram 8, tabular insert). Although combinatorial methods have been commonly adopted for drug discovery and development of new catalysts and materials, the combinatorial approach to produce many examples of 2 and identify the best PEM from the vast numbers of resulting 1 is unprecedented in the development of fuel cell membranes.

(3) The inclusion of a mix of meta and para substitution renders the polymer main chain as a nonlinear rigid structure and makes crystallization difficult. This bent effect is known to improve solubility of the rigid polymers in organic solvents. The bent effect also contributes to the mechanical toughness of the polymer, an important property for operating PEMFCs over a range of temperatures (i.e., −20 to 120° C.). A brittle PEM will lead to the deterioration of the membrane during the swelling and shrinking of membranes caused by the thermal expansion of water.

(4) The short spacer between the aromatic rings ($R_1$ and $R_2$ in Diagram 5-8) will play three important roles: (a) Although wholly aromatic polymers such as poly(p-phenylene) could achieve exceptionally good thermal and mechanical properties, the highly rigid main chain makes the polymer poorly soluble in organic solvents, which causes the precipitation of undesired low-molecular-weight oligomers during the polymerization process.[v,vi] The insertion of a short spacer between the two aromatic groups is designed to give a small degree of freedom along the rigid polymer main chain, thus making the material more soluble in organic solvents. The improved solubility will contribute to increased polymer molecular weight. Overall, the mixed substitution and/or inclusion of a spacer will allow us to control the solubility and molecular weight of the precursor polymers 2. (b) As mentioned in the background section, electrical non-conductivity is one of the important requirements of high-performance PEMs. The spacer, therefore, will be used to block electric conductivity along the polymer main chain. Because benzylic C—H bonds are susceptible to the oxidative degradation mode in fuel cell conditions, spacers made only of C—F, O, or C—$CF_3$ bonds will be used in the proposed research. (c) In the Suzuki-Miyaura cross-coupling reaction, the presence of an electron-withdrawing substituent in aryl bromide is known to activate the reaction, whereas the electronic effect of arylboron compounds is negligible. Thus, substitution of electron-withdrawing groups (i.e., —F, $SF_3$, and —$(CF_2)_n$—) at 3 will promote the coupling reactions, thereby increasing the yields and molecular weights of 2.

(5) As in the cases of sulfonated poly($\alpha,\beta,\beta$-trifluorostyrene) and BAM3G, the presence of an electron-withdrawing substituent such as —F, $CF_3$, or —$CF_2$— on the aromatic ring will significantly increase the acidity of the sulfonic acid group and hence the proton conductivity of 1. Thus, when compared with sulfonated poly(phenylene) (Diagram 1[f]), 1 could achieve higher proton conductivity with a lower level of sulfonation on the aromatic rings. Generally, the high sulfonation levels required by engineering polymers to achieve suitable proton conductivity render the PEMs susceptible to mechanical failure. Thus, our proposed strategy for creating polymers having higher acidity and a lower concentration of sulfonic acid will be able to solve the most important stumbling block in developing alternative PEMs. This advantage will play a critical role in achieving the DOE's target properties without losing mechanical integrity, particularly for fuel cell operations at high temperature (~120° C.) with low RH (25-50%). The electron-poor aromatic ring will also induce a shorter aryl-sulfonic acid bond, which makes de-sulfonation less probable during high-temperature fuel cell operations. Furthermore, the fluorine substitutions on the aromatic polymer electrolytes will make the membrane more hydrophobic, and thus it will absorb much less water when hydrated. The hydrophobic feature of the partially fluorinated polymer will also enhance performance of PEMFCs by improving compatibility and lowering interfacial resistance with MEAs, which typically requires bonding to Nafion™ polymer perfluorinated electrode.

Although specific materials, specific proportions, specific structures, specific conditions (temperature and pressure) and other elements of this disclosure are shown and described herein, these specifics are not intended to be limitations on the scope of practice of this technology, but rather are species within the generic disclosure of technology provided herein.

Monomer Synthesis: As listed in Diagram 5, a variety of monomers 3 and 4, which are either commercially available or can be easily prepared using known synthetic methods, will be used for the preparation of 2. Diagrams 6 and 7 provide detailed synthetic schemes for the monomers.

Dibromoarenes 3e, 3g, 3h, 3j, and 3k are commercially available compounds. Compound 3a was synthesized by gem-difluorination of $5a_3$ using Selectfluor™ solvent and pyridinium polyhydrogen fluoride (PPHF) in 76% yield (eq. 2 of Diagram 6). Fluorination of diarylacetylene 5b with nitosonium tetrafluoroborate-PPHF will produce 3b in a single step (equation 3 of Diagram 6). Reaction of hexafluoroglutaric acid with $XeF_2$ in the presence of bromobenzene will give 1,3-diarylhexafluoropropane 3c as a mixture of ortho-, meta-, and para-isomers (equation 4 of Diagram 6). Conversion of aryl alcohols to aryl bromides using $Ph_3PBr_2$ was adopted to give 3d in 50% yield (equation 5 of Diagram 6). Compounds 3f, 3i, 3l, and 3m can be conveniently prepared via diazotization of corresponding arylamines, 5f, 5i, 5l, and 5m, followed by reaction with CuBr (for 5f, 5i, and 5m) or $HBF_4$ (for 5l) (equation 6 of Diagram 6). Difluorosilanes 3n and 3o can be prepared via the fluorination of the corresponding hydrosilanes 5n and 5o, respectively (eq. of 7 of Diagram 6). Meta-dibromoaryl ketone 5p and meta-dibromodiarylacetylene 5q will be transformed to the corresponding meta-dibromoarenes 3p and 3q, respectively, using procedures similar to those of equations 2 and 3 (equations 8 and 9 of Diagram 6).

In addition, new examples of dibromoarenes which were not included in Diagram 6 will be synthesized according to the following reactions.

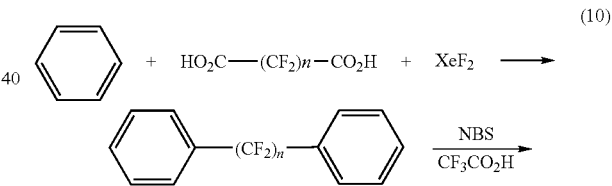

(10)

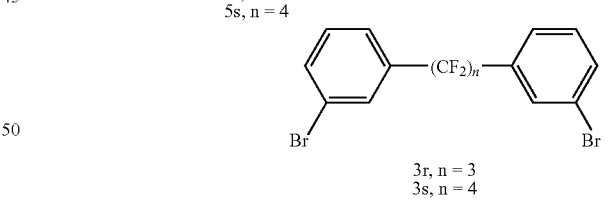

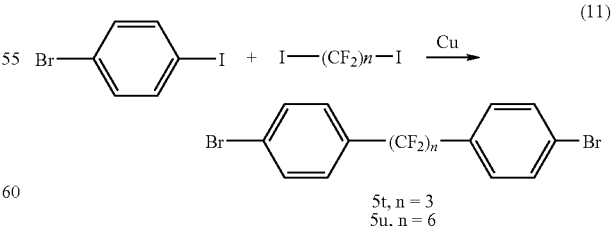

(11)

What is claimed:

1. A method of forming sulfonated poly(arylene-alt-alkylene)s according to the reaction scheme of:

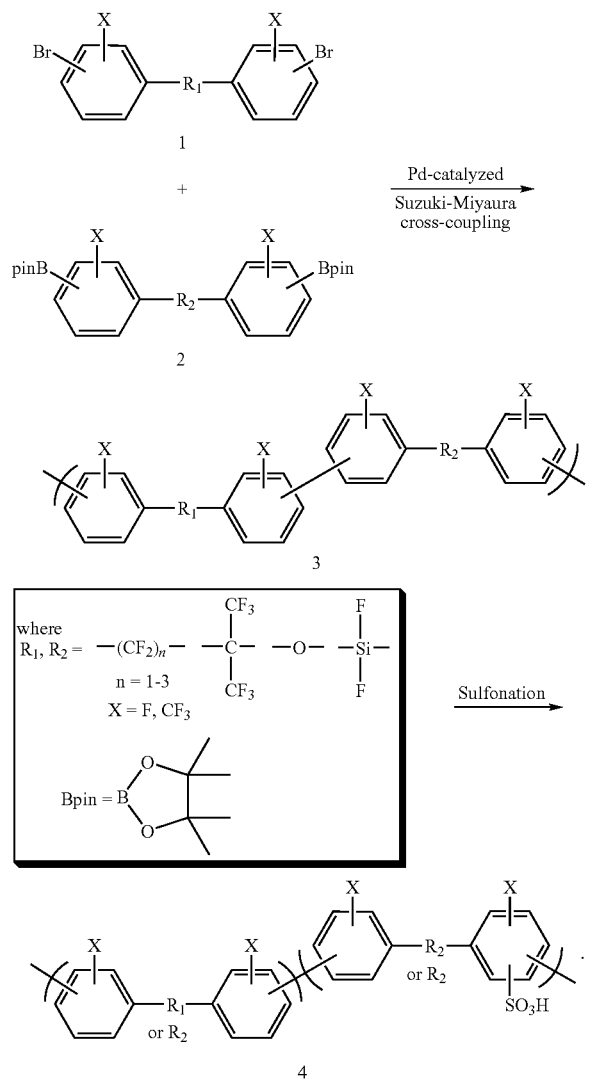

2. The method of claim 1 wherein X═F.

3. The method of 1 wherein X═CF$_3$.

4. The sulfonated poly(arylene-alt-alkylene)s of the formula:

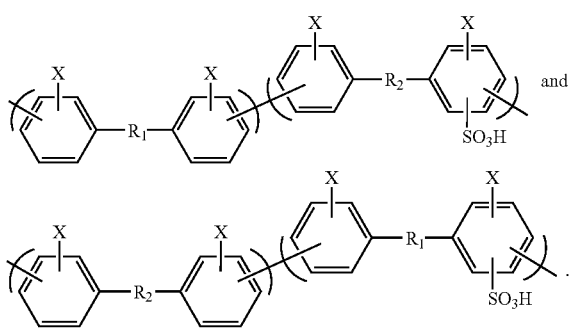

5. The sulfonated poly(arylene-alt-alkylene)s of claim 4 wherein at least one of R$_1$ and R$_2$ comprises —(CF2)n-,

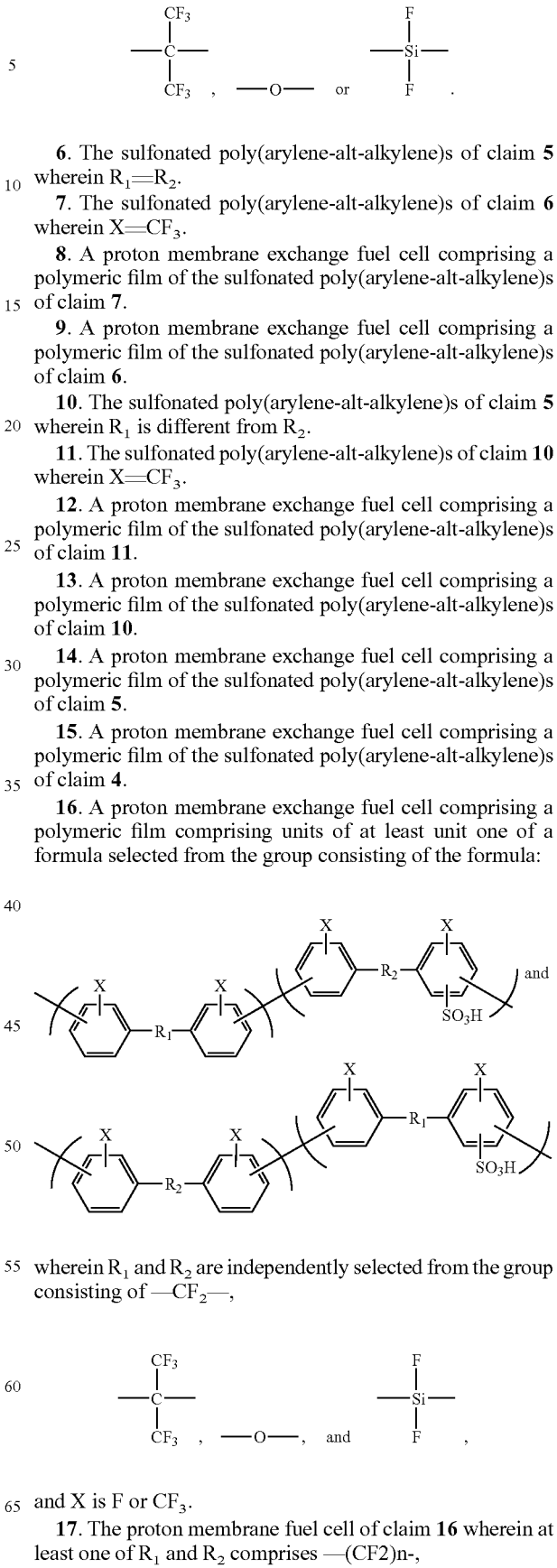

6. The sulfonated poly(arylene-alt-alkylene)s of claim 5 wherein R$_1$═R$_2$.

7. The sulfonated poly(arylene-alt-alkylene)s of claim 6 wherein X═CF$_3$.

8. A proton membrane exchange fuel cell comprising a polymeric film of the sulfonated poly(arylene-alt-alkylene)s of claim 7.

9. A proton membrane exchange fuel cell comprising a polymeric film of the sulfonated poly(arylene-alt-alkylene)s of claim 6.

10. The sulfonated poly(arylene-alt-alkylene)s of claim 5 wherein R$_1$ is different from R$_2$.

11. The sulfonated poly(arylene-alt-alkylene)s of claim 10 wherein X═CF$_3$.

12. A proton membrane exchange fuel cell comprising a polymeric film of the sulfonated poly(arylene-alt-alkylene)s of claim 11.

13. A proton membrane exchange fuel cell comprising a polymeric film of the sulfonated poly(arylene-alt-alkylene)s of claim 10.

14. A proton membrane exchange fuel cell comprising a polymeric film of the sulfonated poly(arylene-alt-alkylene)s of claim 5.

15. A proton membrane exchange fuel cell comprising a polymeric film of the sulfonated poly(arylene-alt-alkylene)s of claim 4.

16. A proton membrane exchange fuel cell comprising a polymeric film comprising units of at least unit one of a formula selected from the group consisting of the formula:

wherein R$_1$ and R$_2$ are independently selected from the group consisting of —CF$_2$—, and X is F or CF$_3$.

17. The proton membrane fuel cell of claim 16 wherein at least one of R$_1$ and R$_2$ comprises —(CF2)n-,

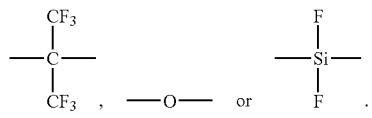
18. The proton membrane fuel cell of claim 17 wherein $X=CF_3$.
19. The proton membrane fuel cell of claim 16 wherein $R_1=R_2$.
20. The proton membrane fuel cell of claim 19 wherein $X=CF_3$.
21. The proton membrane fuel cell of claim 16 wherein $R_1$ is different from $R_2$.
* * * * *

UNITED STATES PATENT AND TRADEMARK OFFICE
CERTIFICATE OF CORRECTION

| | | |
|---|---|---|
| PATENT NO. | : 7,615,300 B2 | Page 1 of 1 |
| APPLICATION NO. | : 11/512937 | |
| DATED | : November 10, 2009 | |
| INVENTOR(S) | : Chulsung Bae | |

It is certified that error appears in the above-identified patent and that said Letters Patent is hereby corrected as shown below:

On Column 1, after line 10, please insert:

--GOVERNMENT CONTRACT NOTICE

This invention was made with government support under DE-FG36-05GO85028 awarded by the Department of Energy. The government has certain rights in the invention.--

Signed and Sealed this
Second Day of October, 2012

David J. Kappos
*Director of the United States Patent and Trademark Office*